Oct. 22, 1957  W. V. DREWRYS  2,810,297
CHAIN LINK CONNECTING MEANS
Filed Nov. 3, 1955  2 Sheets-Sheet 1
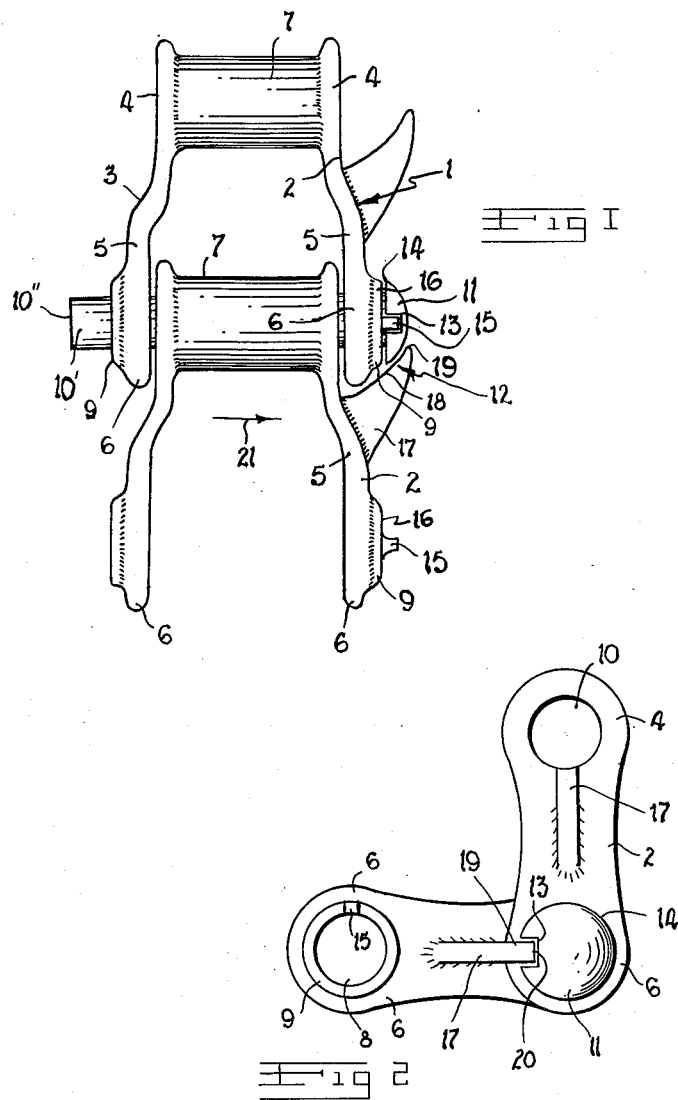
INVENTOR
WALTER V. DREWRYS
PATENT ATTY'S

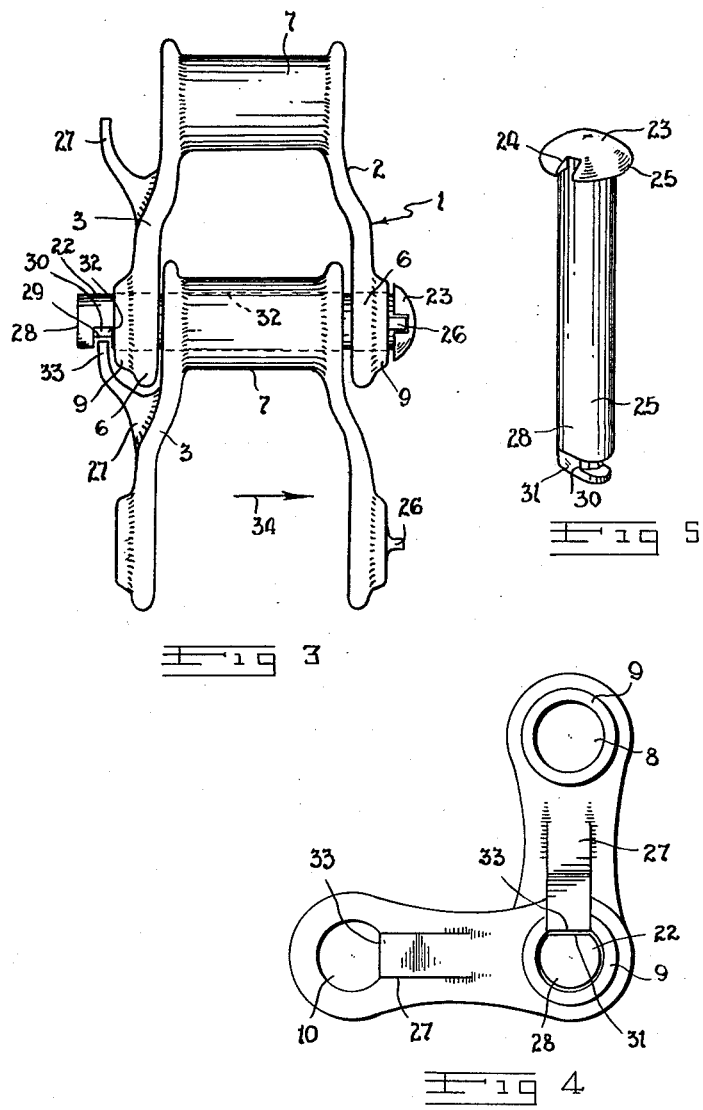

United States Patent Office 2,810,297
Patented Oct. 22, 1957

2,810,297

CHAIN LINK CONNECTING MEANS

Walter V. Drewrys, Winnipeg, Manitoba, Canada

Application November 3, 1955, Serial No. 544,779

4 Claims. (Cl. 74—254)

My invention relates to new and useful improvements in connecting means for adjacent links of a chain length, the principal object and essence of my invention being to provide connecting means which cannot be disengaged unless adjacent links are moved substantially at right angles one with the other.

A further object of my invention is to provide a device of the character herewithin described which eliminates the conventional cotter pin means of retaining the link pin through adjacent links.

Yet another object of my invention is to provide a device of the character herewithin described which simplifies the removal of one or more links from a length of chain.

A still further object of my invention is to provide a device of the character herewithin described in which the link pin cannot become displaced when the chain belt is in normal use.

A further object of my invention is to provide a device of the character herewithin described which is simple in construction, economical in manufacture, and operation, and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

Figure 1 is a top plan view of a pair of links showing one embodiment of my device.

Figure 2 is a right hand end elevation with relation to Figure 1, but with the links at right angles and in the pin removing position.

Figure 3 is a top plan view of a pair of links incorporating an alternative embodiment of my device.

Figure 4 is a view similar to Figure 2, but having regards to Figure 3.

Figure 5 is a view of the pin of Figure 3 shown in perspective and at right angles to Figure 3.

In the drawings like characters of reference indicate corresponding parts in the different figures.

The conventional chain belt utilized in conveyor mechanism and the like comprises a plurality of links pivotally connected together by means of a link pin having a head on one end and a drilling through the other end. A split cotter pin is normally passed through the drilling so that when the ends are spread apart, the pin cannot be moved endwise through the links. After considerable use, particularly in manufacturing processes, the cotter pin tends to become rusted into position, thereby making it extremely difficult and time consuming to remove in the event that replacements or repairs are necessary to the link belt.

The main object of the present device is to eliminate the conventional cotter pin, yet retain the safety features thereof, the pin being removable only when adjacent links are turned at right angles one to the other, a condition that cannot possibly occur during operation, but which can be obtained when the belt is stationary and the slack is not taken up.

Proceeding, therefore, to describe my invention in detail, reference should be made first to Figures 1 and 2, and it will be seen that I have illustrated a conventional link collectively designated 1 having a pair of side plates 2 and 3 being parallel at the ends 4 thereof, but being cranked or angulated as at 5 so that the ends 6 thereof are parallel, but spaced wider apart than the ends 4, the purpose of which is clearly apparent from the drawings.

A hollow cylindrical barrel 7 spans the ends 4 transversely and connects same together, it being understood that the ends 4 are apertured so that there is a bore 8 clear through the barrel and the ends.

The opposite ends 6 of the links are thickened as at 9 and are apertured as at 10 to provide a bearing surface in conjunction with the barrel 7 of the next adjacent links.

A link pin 10' having a domed head 11 at one end thereof is adapted to pass through the bearing ends 9 of one link and through the barrel 7 of the next adjacent link, which is adapted to be situated between the ends 6 of the first mentioned links.

It should be noted here that the extremity 10" of the pin projecting through the one side 6 of the link is normally drilled transversely to take a conventional cotter pin to prevent endwise movement of the pins with relation to the links.

However, I have provided means collectively designated 12 to eliminate this cotter pin. It will be noted that the head 11 of the pin is slotted as at 13, this slot being radially situated with relation to the head and being open on the perimeter 14 thereof. A stop 15 is formed upon the side 16 of the bearing portion 9, said stop being adapted to engage slot 13, thus preventing relative rotation of the pin with the uppermost link with relation to Figure 1.

The lowermost link 2 with relation to Figure 1 is provided with a lug 17 secured to and extending from the side plate 5 adjacent the head 11 of the pin. This lug, which is substantially triangular when viewed in plan, extends upwardly and rearwardly towards the head of the pin with relation to Figure 1 and is shaped upon the inner surface 18 thereof to cover part of the domed head 11 of the pin, as clearly indicated, and it should be noted that the extremity 19 of the lug does not extend beyond the base 20 of the slot 13.

In operation, it will be appreciated that when the pin is in position, as shown in Figure 1, the pin cannot be moved endwise because the domed head will strike the extremity 19 of the lug, but when it is desired to remove the pin, the uppermost link 2 is rotated through ninety degrees to take up the position shown in Figure 2.

Due to the engagement of the stop 15 with the slot 13, this also rotates the pin until the extremity 19 overlies the stop 15, it being observed that the width of the slot is at least equal to or preferably greater than the width of the extremity 19 of the lug 17.

This permits the pin to be moved endwise in the direction of arrow 21, thus permitting the links to be separated.

The replacement is an exact reversal of this procedure and, once the pin is in position, the uppermost link can be rotated so that it carries the stop 15 out of alignment with the lug 17.

It will be observed that the position shown between the lugs in Figure 2 cannot be encountered during normal running operations, so that there is no danger of the pin accidently becoming displaced.

Turning now to a description of the alternative embodiment shown in Figures 3, 4 and 5, corresponding parts have been given corresponding reference characters, insofar as the construction of the links are concerned (numbers 1 to 10 inclusive).

In this embodiment, the connection between adjacent links also takes the form of a pin 22 having a domed head 23 upon one end thereof. This domed head also has a recess 24 formed radially thereon, the recess opening onto the perimeter 25 thereof. Also provided is a stop 26 extending from the bearing portion 9 of the link end 6. When in the position shown in Figure 3, it will be observed that this stop engages the recess 24 as described in the previous embodiment.

However, in order to prevent relative endwise movement of the pin 22, a curved finger lug 27 is formed on and extends outwardly from the side plate 3 on the side adjacent the extremity 28 of the pin. This extremity 28 is provided with a partially annular groove 29 formed adjacent the end of the pin and substantially ninety degrees radially from the slot 24 in the head. It will be noted that one end 30 of this slot terminates upon the surface of a flat 31 formed across the end of the pin and substantially in radial alignment with the recess 24. It will be observed that the depth of this flat is sufficient so that the base of the recess opens out thereon and that the width of the flat is at least equal from the end of the pin to the rear wall 32 of the groove.

It will also be observed that the extremity 33 of the finger lug 27 is adapted to engage within this groove 29 when the pin is in the position shown in Figure 3.

In operation, when the links are in the operating position shown in Figure 3, the extremity 33 of the lug 27 entering within the groove 29 prevents endwise movement of the pin and that rotation of the pin independently of the uppermost link with respect to Figure 3 is prevented by the engagement of the stop 26 with the recess 24 in the head of the pin.

However, when it is desired to disengage the links, the uppermost link with respect to Figure 3 is moved upwardly at right angles to take the position shown in Figure 4 in a manner similar to that described for the previous embodiment. This brings the extremity 33 of the lug out of engagement with the groove 29 so that it rests just above the flat 31 upon the end of the pin. Inasmuch as the flat extends clear to the extremity 28 of the pin, this means that the pin can now be moved in the direction of arrow 34, thus releasing the links.

Once again, replacement is an exact reversal of this procedure, and when the pin is inserted to take up the position shown in Figure 4, the uppermost link can then be rotated through ninety degrees to take up the position shown in Figure 3, thus engaging the groove with the extremity 33 of the lug 27.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. Means for detachably connecting together adjacent chain links of the type including a pair of side plates apertured at one end thereof and a transverse hollow barrel spanning the other ends thereof and connecting said side plates together; said means for detachably connecting together adjacent links, including a cylindrical pin adapted to pass through said apertures of one link and through the barrel of the adjacent link, a slotted head on one end of said pin, means cooperating between said pin and said links adapted to selectively retain said pin in position, said means including a stop secured to and extending from one of said side plates and located at substantially 90 degrees from the longitudinal axis of said side plate, said stop adapted to engage said slotted head when said pin is in position, and lug means extending from one of said side plates adapted to selectively prevent endwise movement of said pin.

2. The device according to claim 1 in which said lug is offset from said side plates and curved therefrom, said lug being adapted to contact the surface of the head of said pin an amount substantially equal to the depth of said slot, when said pin is in position, the width of said slot being at least equal to the width of said lug, said lug restricting endwise movement of said pin unless same is rotated to align said stop with said lug.

3. The device according to claim 1 in which said means cooperating between said pin and said link adapted to selectively retain said pin in position includes a partially groove formed adjacent the end of said pin remote from said head and substantially radially at right angles therefrom, said lug adapted to engage said groove, and means cooperating between said pin and said groove substantially radially at ninety degrees therefrom adapted to permit disengagement of said lugs from said groove.

4. The device according to claim 3 in which said last-mentioned means comprises a flat formed on the end of said pin substantially ninety degrees from said groove, the radial depth of said flat substantially equalling the depth of said groove, the width of said flat substantially equalling the distance from the end of said pin to the rear wall of said groove.

References Cited in the file of this patent
UNITED STATES PATENTS

| | | |
|---|---|---|
| 455,108 | McBride | June 30, 1891 |
| 1,426,248 | Bethke | Aug. 15, 1922 |